US012614743B2

(12) United States Patent
Yang et al.

(10) Patent No.: US 12,614,743 B2
(45) Date of Patent: Apr. 28, 2026

(54) DISCRETIZATION MODELING METHOD FOR ELECTRO-OSMOTIC DRAG EFFECT OF WATER CONSERVATION IN A FUEL CELL

(71) Applicant: CATARC New Energy Vehicle Test Center (Tianjin) Co., Ltd., Tianjin (CN)

(72) Inventors: Zirong Yang, Tianjin (CN); Dong Hao, Tianjin (CN); Yanyi Zhang, Tianjin (CN); Xiaobing Wang, Tianjin (CN); Guang Chen, Tianjin (CN); Daokuan Jiao, Tianjin (CN); Yan Li, Tianjin (CN); Ruidi Wang, Tianjin (CN)

(73) Assignee: CATARC NEW ENERGY VEHICLE TEST CENTER (TIANJIN) CO., LTD., Tianjin (CN)

( * ) Notice: Subject to any disclaimer, the term of this patent is extended or adjusted under 35 U.S.C. 154(b) by 861 days.

(21) Appl. No.: 17/970,159

(22) Filed: Oct. 20, 2022

(65) Prior Publication Data

US 2023/0361323 A1     Nov. 9, 2023

(30) Foreign Application Priority Data

May 6, 2022    (CN) .......................... 202210487531.2

(51) Int. Cl.
*H01M 8/04291*     (2016.01)
*H01M 8/04298*     (2016.01)

(52) U.S. Cl.
CPC ... *H01M 8/04291* (2013.01); *H01M 8/04305* (2013.01)

(58) Field of Classification Search
CPC ...................... H01M 8/04291; H01M 8/04305
See application file for complete search history.

(56) References Cited

FOREIGN PATENT DOCUMENTS

| | | |
|---|---|---|
| CN | 110399639 A | 11/2019 |
| CN | 113297756 A | 8/2021 |
| CN | 114006009 A | 2/2022 |

OTHER PUBLICATIONS

First Office Action in corresponding Chinese Application No. 202210487531.2, dated Jun. 13, 2022; 12 pgs.
Search Report in corresponding Chinese Application No. 202210487531.2, dated Jun. 7, 2022; 6 pgs.

*Primary Examiner* — Brian O Peters
(74) *Attorney, Agent, or Firm* — PORUS IP LLC

(57) ABSTRACT

The present disclosure provides a discretization modeling method for electro-osmotic drag effect of water conservation in a fuel cell, comprising: establishing a conservation equation of membrane water in the fuel cell, performing a discretization for a complete electro-osmotic drag effect, obtaining a discretization simulation model of the complete electro-osmotic drag effect based on results of the discretization, solving the conservation equation of membrane water to establish a discretization simulation model of electro-osmotic drag effect of water conservation in the fuel cell. The discretization modeling method for the electro-osmotic drag effect of water conservation in a fuel cell in the present disclosure can perform a discretization and a numerical calculation for a complete electro-osmotic drag effect, the discretization comprising a water conservation portion caused by a membrane water content gradient and a water conservation portion caused by a proton transport flux gradient.

5 Claims, 6 Drawing Sheets anode catalytic layer    proton exchange membrane    cathode catalytic layer $\lambda_1, J_1$    $\lambda_2, J_2$    $\lambda_3, J_3$    $\lambda_4, J_4$ $\lambda_{CLa}$    $\lambda_{MEM}$    $\lambda_{CLc}$ $\delta_{CLa}$    $\delta_{MEM}$    $\delta_{CLc}$ anode catalytic layer    proton exchange membrane    cathode catalytic layer $\lambda_1, J_1$    $\lambda_2, J_2$    $\lambda_3, J_3$    $\lambda_4, J_4$ $\lambda_{CLa}$    $\lambda_{MEM}$    $\lambda_{CLc}$ $\delta_{CLa}$    $\delta_{MEM}$    $\delta_{CLc}$

DISCRETIZATION MODELING METHOD FOR ELECTRO-OSMOTIC DRAG EFFECT OF WATER CONSERVATION IN A FUEL CELL

RELATED APPLICATIONS

The present application claims priority from Chinese Application Number 202210487531.2, filed May 6, 2022, the disclosure of which is hereby incorporated by reference herein in its entirety.

FIELD

The present disclosure relates to the field of proton exchange membrane fuel cell and more particularly to a discretization modeling method for the electro-osmotic drag effect of water conservation in a fuel cell.

BACKGROUND

A Proton Exchange Membrane Fuel Cell (PEMFC) is a device that converts chemical energy into electrical energy through electrochemical reaction. It has the advantages of high energy conversion efficiency, low operating temperature, zero noise and zero emission, etc. It is supposed to become one of the clean power sources widely used in the transportation industry in the future.

Hydrogen enters the fuel cell from the inlet of the anode flow path and then passes through the porous media layer to reach the three-phase reaction interface of the catalytic layer where it is converted into protons and electrons. Protons can move directly in the proton exchange membrane while electrons can only move through external circuits. Oxygen (or air) enters from the cathode flow path and is then transported through the gas diffusion layer and the microporous layer to the cathode catalytic layer for a reduction reaction to produce water. As a core component of a fuel cell, a proton exchange membrane provides a channel or path through which protons move from the anode to the cathode. Because of the polarity of water molecules, which are easily bonded to protons by hydrogen bonds to form hydrated hydrogen ions (e.g. $H_3O^+$, $H_5O_2^+$, etc.), a certain number of water molecules are carried when the protons are transported from the anode to the cathode, a transport mechanism known as the electro-osmotic drag effect. The electro-osmotic drag effect affects the distribution of water in the anode catalyst layer, the proton exchange membrane and the cathode catalyst layer to a great extent, and the wettability of the membrane electrode determines the level of proton conductivity, which affects the ohmic voltage loss and the output performance of the fuel cell. In view of the fact that the test method can't measure the electro-osmotic drag effect in the fuel cell in the operating state, the numerical simulation method becomes an effective method to characterize the electro-osmotic drag effect. At present, some domestic and foreign simulation researches have adopted the simplified method in calculating the electro-osmotic drag effect, that is, ignoring the complete electro-osmotic drag effect, resulting in the inaccuracy of solving the water conservation process in the fuel cell, and affecting the overall reliability of the simulation model. Therefore, it is necessary to propose a discretization modeling method for electro-osmotic drag effect of water conservation in the fuel cell, which can discretize and compute the complete electro-osmotic drag effect, promote the progress of numerical simulation technology of the fuel cell, and promote the forward design and development ability of fuel cell products in China.

SUMMARY

To solve the above technical problems, the present disclosure provides a discretization modeling method for electro-osmotic drag effect of water conservation in a fuel cell, comprising:

S1, establishing a conservation equation of membrane water in the fuel cell;

S2, performing a discretization for a complete electro-osmotic drag effect;

S3, obtaining a discretization simulation model of the complete electro-osmotic drag effect based on results of the discretization in S2;

S4, solving the conservation equation of membrane water to establish a discretization simulation model of electro-osmotic drag effect of water conservation in the fuel cell;

performing the discretization for the complete electro-osmotic drag effect comprising: performing a discretization for a water conservation portion caused by a membrane water content gradient and performing a discretization for a water conservation portion caused by a proton transport flux gradient;

for the water conservation portion caused by the membrane water content gradient, a calculation expression is as follows:

$$\begin{cases} \dfrac{1}{F}\left(J_{ion}\dfrac{\partial n_d}{\partial x}\right)\Big|_{CLa} = \dfrac{2.5}{22F}\left(J_{ion}^{CLa}\dfrac{\lambda_2-\lambda_1}{\delta_{CLa}}\right) \\ \dfrac{1}{F}\left(J_{ion}\dfrac{\partial n_d}{\partial x}\right)\Big|_{MEM} = \dfrac{2.5}{22F}\left(J_{ion}^{MEM}\dfrac{\lambda_3-\lambda_2}{\delta_{MEM}}\right) \\ \dfrac{1}{F}\left(J_{ion}\dfrac{\partial n_d}{\partial x}\right)\Big|_{CLc} = \dfrac{2.5}{22F}\left(J_{ion}^{CLc}\dfrac{\lambda_4-\lambda_3}{\delta_{CLc}}\right) \end{cases} \tag{8}$$

where F is the Faraday's constant;

$$\dfrac{1}{F}\left(J_{ion}\dfrac{\partial n_d}{\partial x}\right)\Big|_{CLa},\ \dfrac{1}{F}\left(J_{ion}\dfrac{\partial n_d}{\partial x}\right)\Big|_{MEM},\ \text{and}\ \dfrac{1}{F}\left(J_{ion}\dfrac{\partial n_d}{\partial x}\right)\Big|_{CLc}$$

are the water conservation portions caused by the membrane water content gradient in an anode catalytic layer, a proton exchange membrane, and a cathode catalytic layer, respectively;

$$J_{ion}^{CLa},\ J_{ion}^{MEM},\ J_{ion}^{CLc}$$

are the proton transport flux in the anode catalytic layer, the proton exchange membrane, and the cathode catalytic layer, respectively; $\delta_{CLa}$, $\delta_{MEM}$, $\delta_{CLc}$ are thickness of the anode catalytic layer, the proton exchange membrane, and the cathode catalytic layer, respectively; $\lambda_1$, $\lambda_2$, $\lambda_3$, $\lambda_4$ are the membrane water content at the left boundary of the anode catalytic layer, at the interface between the anode catalytic layer and the proton exchange membrane, at the interface between the proton exchange membrane and the cathode catalytic layer, and at the right boundary of the cathode catalytic layer;

the calculation expressions of the proton transport flux in the anode catalytic layer, the proton exchange membrane, and the cathode catalytic layer are as follows:

$$\begin{cases} J_{ion}^{CLa} = \dfrac{J_1 + J_2}{2} \\[2mm] J_{ion}^{MEM} = \dfrac{J_2 + J_3}{2} \\[2mm] J_{ion}^{CLc} = \dfrac{J_3 + J_4}{2} \end{cases} \qquad (9)$$

where, $J_1$, $J_2$, $J_3$, $J_4$ are the proton transport flux at the left boundary of the anode catalytic layer, at the interface between the anode catalytic layer and the proton exchange membrane, at the interface between the proton exchange membrane and the cathode catalytic layer, and at the right boundary of the cathode catalytic layer;

for the proton transport flux at the interface between the anode catalytic layer and the proton exchange membrane and at the interface between the proton exchange membrane and the cathode catalytic layer, the expressions are as follows:

$$\begin{cases} J_1, \ J_4 = 0 \\ J_2, \ J_3 = I \end{cases} \qquad (10)$$

where I is current density;

for the water conservation portion caused by the proton transport flux gradient, the calculation expressions are as follows:

$$\begin{cases} \dfrac{1}{F}\left(n_d \dfrac{\partial J_{ion}}{\partial x}\right)\Big|_{CLa} = \dfrac{2.5}{22F}\left(\lambda_{CLa}\dfrac{J_2 - J_1}{\delta_{CLa}}\right) \\[2mm] \dfrac{1}{F}\left(n_d \dfrac{\partial J_{ion}}{\partial x}\right)\Big|_{MEM} = \dfrac{2.5}{22F}\left(\lambda_{MEM}\dfrac{J_3 - J_2}{\delta_{MEM}}\right) \\[2mm] \dfrac{1}{F}\left(n_d \dfrac{\partial J_{ion}}{\partial x}\right)\Big|_{CLc} = \dfrac{2.5}{22F}\left(\lambda_{CLc}\dfrac{J_4 - J_3}{\delta_{CLc}}\right) \end{cases} \qquad (11)$$

where $\dfrac{1}{F}\left(n_d \dfrac{\partial J_{ion}}{\partial x}\right)\Big|_{CLa}$, $\dfrac{1}{F}\left(n_d \dfrac{\partial J_{ion}}{\partial x}\right)\Big|_{MEM}$ and $\dfrac{1}{F}\left(n_d \dfrac{\partial J_{ion}}{\partial x}\right)\Big|_{CLc}$ are the water conservation portions caused by the proton transport flux gradient in the anode catalytic layer, the proton exchange membrane, and the cathode catalytic layer, $\lambda_{CLa}$, $\lambda_{MEM}$, $\lambda_{CLc}$ are the membrane water content at the center of the anode catalytic layer, the proton exchange membrane, and the cathode catalytic layer, respectively.

Further, the conservation equation of membrane water in the fuel cell in S1 is as follows:

$$\frac{\rho_{mem}}{EW}\frac{\partial(\omega\lambda)}{\partial t} + \nabla\cdot\left(n_d\frac{J_{ion}}{F}\right) = \frac{\rho_{mem}}{EW}\nabla\cdot\left(\omega^{1.5}D_{mw}\nabla\lambda\right) + S_{mw} \qquad (1)$$

where $\rho_{MEM}$ is proton exchange membrane density, EW is equivalent weight of proton exchange membrane $\omega$ is a volume fraction of ionomer, $\lambda$ is membrane water content, t is time, $n_d$ is an electro-osmotic drag coefficient, $J_{ion}$ is a proton transport flux, F is a Faraday's constant, $D_{mw}$ is a membrane water diffusivity, $S_{mw}$ is a membrane water source term;

the calculation expressions of the membrane water source term are as follows:

$$S_{mw} = \begin{cases} S_{react} - S_{m-v} - S_{m-1} & \text{(cathode catalytic layer)} \\ -S_{m-v} - S_{m-1} & \text{(anode catalytic layer)} \end{cases} \qquad (2)$$

where $S_{mw}$ is a membrane water source term, $S_{react}$ is a water source term of electrochemical reaction product, $S_{m-v}$ is a phase change source term between membrane water and water vapor and $S_{m-1}$ is a phase change source term between membrane water and liquid water.

Further, the expression of the electro-osmotic drag effect is as follows:

$$\nabla\cdot\left(n_d\frac{J_{ion}}{F}\right) = \frac{1}{F}\left(J_{ion}\frac{\partial n_d}{\partial x} + n_d\frac{\partial J_{ion}}{\partial x}\right) \qquad (6)$$

where $n_d$ is the electro-osmotic drag coefficient, $J_{ion}$ is the proton transport flux, F is the Faraday's constant, x is a through-plane direction, $\lambda$ is the membrane water content, $$\frac{1}{F}\left(J_{ion}\frac{\partial n_d}{\partial x}\right)$$

is the water conservation portion caused by a membrane water content gradient, and $$\frac{1}{F}\left(n_d\frac{\partial J_{ion}}{\partial x}\right)$$

is the water conservation portion caused by a proton transport flux gradient.

Further, the calculation expressions of the complete electro-osmotic drag effect are as follows:

$$\begin{cases} \nabla\cdot\left(n_d\dfrac{J_{ion}}{F}\right)\Big|_{CLa} = \dfrac{2.5I}{22F}\left(\dfrac{1}{2}\dfrac{\lambda_2 - \lambda_1}{\delta_{CLa}} + \dfrac{\lambda_{CLa}}{\delta_{CLa}}\right) \\[2mm] \nabla\cdot\left(n_d\dfrac{J_{ion}}{F}\right)\Big|_{MEM} = \dfrac{2.5I}{22F}\left(\dfrac{\lambda_3 - \lambda_2}{\delta_{MEM}}\right) \\[2mm] \nabla\cdot\left(n_d\dfrac{J_{ion}}{F}\right)\Big|_{CLc} = \dfrac{2.5I}{22F}\left(\dfrac{1}{2}\dfrac{\lambda_4 - \lambda_3}{\delta_{CLc}} - \dfrac{\lambda_{CLc}}{\delta_{CLc}}\right) \end{cases} \qquad (12)$$

where I is a current density; F is the Faraday's constant; $\lambda_1$, $\lambda_2$, $\lambda_3$, $\lambda_4$ are the membrane water content at the left boundary of the anode catalytic layer, at the interface between the anode catalytic layer and the proton exchange membrane, at the interface between the proton exchange membrane and the cathode catalytic layer, and at the right boundary of the cathode catalytic layer, respectively; $\delta_{CLa}$, $\delta_{MEM}$, $\delta_{CLc}$ are the thickness of the anode catalytic layer, the proton exchange membrane, and the cathode catalytic layer, respectively; and $\lambda_{CLa}$, $\lambda_{CLc}$ are the membrane water content at the center of the anode catalytic layer and the cathode catalytic layer;

the membrane water content at the left boundary of the anode catalytic layer, at the interface between the anode catalytic layer and the proton exchange membrane, at the interface between the proton exchange membrane and the cathode catalytic layer, and at the right boundary of the cathode catalytic layer right boundary are solved by linear interpolation, and the calculation expressions are as follows:

$$
\begin{cases}
\lambda_1 = \lambda_{CLa} - \dfrac{\lambda_{MEM} - \lambda_{CLa}}{\delta_{MEM} + \delta_{CLa}}\delta_{CLa} \\[2ex]
\lambda_2 = \lambda_{CLa} + \dfrac{\lambda_{MEM} - \lambda_{CLa}}{\delta_{MEM} + \delta_{CLa}}\delta_{CLa} \\[2ex]
\lambda_3 = \lambda_{MEM} + \dfrac{\lambda_{CLc} - \lambda_{MEM}}{\delta_{CLc} + \delta_{MEM}}\delta_{MEM} \\[2ex]
\lambda_4 = 2\lambda_{CLc} - \lambda_{MEM} - \dfrac{\lambda_{CLc} - \lambda_{MEM}}{\delta_{CLc} + \delta_{MEM}}\delta_{MEM}
\end{cases} \tag{13}
$$

the discretization simulation model of the complete electro-osmotic drag effect obtained based on the conservation equation of membrane water in the fuel cell is as follows:

$$
\begin{cases}
\nabla \cdot \left(n_d \dfrac{J_{ion}}{F}\right) \bigg|_{CLa} = \dfrac{2.5I}{22F}\left(\dfrac{\lambda_{MEM} - \lambda_{CLa}}{\delta_{MEM} + \delta_{CLa}}\right) \\[3ex]
\nabla \cdot \left(n_d \dfrac{J_{ion}}{F}\right) \bigg|_{MEM} = \dfrac{2.5I}{22F}\left(\dfrac{\lambda_{MEM}\delta_{CLc} + \lambda_{CLc}\delta_{MEM}}{\delta_{MEM}(\delta_{MEM} + \delta_{CLc})} - \dfrac{\lambda_{CLa}\delta_{MEM} + \lambda_{MEM}\delta_{CLa}}{\delta_{MEM}(\delta_{MEM} + \delta_{CLa})}\right) \\[3ex]
\nabla \cdot \left(n_d \dfrac{J_{ion}}{F}\right) \bigg|_{CLc} = -\dfrac{2.5I}{22F}\left(\dfrac{\lambda_{MEM}}{\delta_{CLc}} + \dfrac{\lambda_{CLc} - \lambda_{MEM}}{\delta_{MEM} + \delta_{CLc}}\dfrac{\delta_{MEM}}{\delta_{CLc}}\right)
\end{cases} \tag{14}
$$

Further, solving the conservation equation of membrane water to establish the discretization simulation model of electro-osmotic drag effect of water conservation in the fuel cell in S4 are as follows:

$$
\lambda_{CLa}^t = \lambda_{CLa}^{t-\Delta t} + \left\{ \frac{(\lambda_{MEM}^{t-\Delta t} - \lambda_{CLa}^{t-\Delta t})D_{MEM\_CLa}^{\lambda,eff}}{\left(\dfrac{\delta_{CLa}}{2} + \dfrac{\delta_{MEM}}{2}\right)\delta_{CLa}} + \right.
$$
$$
\left. \left(-\frac{2.5I}{22F}\left(\frac{\lambda_{MEM}^{t-\Delta t} - \lambda_{CLa}^{t-\Delta t}}{\delta_{MEM} + \delta_{CLa}} + \frac{\lambda_{CLa}^{t-\Delta t}}{\delta_{CLa}}\right) + S_{mw}\right)\frac{EW}{\rho_{MEM}} \right\}\frac{\Delta t}{\omega_{CLa}} \tag{15}
$$

$$
\lambda_{MEM}^t =
$$
$$
\lambda_{MEM}^{t-\Delta t} + \left\{ \frac{(\lambda_{CLc}^{t-\Delta t} - \lambda_{MEM}^{t-\Delta t})D_{MEM\_CLc}^{\lambda,eff}}{\left(\dfrac{\delta_{CLc}}{2} + \dfrac{\delta_{MEM}}{2}\right)\delta_{MEM}} - \frac{(\lambda_{MEM}^{t-\Delta t} - \lambda_{CLa}^{t-\Delta t})D_{MEM\_CLa}^{\lambda,eff}}{\left(\dfrac{\delta_{CLa}}{2} + \dfrac{\delta_{MEM}}{2}\right)\delta_{MEM}} - \right.
$$
$$
\left. \frac{2.5I}{22F}\left(\frac{\lambda_{MEM}^{t-\Delta t}\delta_{CLc} + \lambda_{CLc}^{t-\Delta t}\delta_{MEM}}{\delta_{MEM}(\delta_{MEM} + \delta_{CLc})} - \frac{\lambda_{CLa}^{t-\Delta t}\delta_{MEM} + \lambda_{MEM}^{t-\Delta t}\delta_{CLa}}{\delta_{MEM}(\delta_{MEM} + \delta_{CLa})}\right)\frac{EW}{\rho_{MEM}} \right\}\frac{\Delta t}{\omega_{MEM}} \tag{16}
$$

$$
\lambda_{CLc}^t = \lambda_{CLc}^{t-\Delta t} + \left\{ -\frac{(\lambda_{CLc}^{t-\Delta t} - \lambda_{MEM}^{t-\Delta t})D_{MEM\_CLc}^{\lambda,eff}}{\left(\dfrac{\delta_{CLc}}{2} + \dfrac{\delta_{MEM}}{2}\right)\delta_{CLc}} + \right.
$$
$$
\left. \left(\frac{2.5I}{22F}\left(\frac{\lambda_{MEM}^{t-\Delta t}}{\delta_{CLc}} + \frac{\lambda_{CLc}^{t-\Delta t} - \lambda_{MEM}^{t-\Delta t}}{\delta_{MEM} + \delta_{CLc}}\frac{\delta_{MEM}}{\delta_{CLc}}\right) + S_{mw}\right)\frac{EW}{\rho_{MEM}} \right\}\frac{\Delta t}{\omega_{CLc}} \tag{17}
$$

where $$\lambda_{CLa}^t, \lambda_{MEM}^t, \lambda_{CLc}^t$$

are the membrane water content at the center of the anode catalytic layer, the proton exchange membrane and the cathode catalytic layer respectively at the time of t, $$\lambda_{CLa}^{t-\Delta t}, \lambda_{MEM}^{t-\Delta t}, \lambda_{CLc}^{t-\Delta t}$$

correspond to the membrane water content at the center of the anode catalytic layer, the proton exchange membrane and the cathode catalytic layer respectively at the time t–Δt, $$D_{MEM\_CLa}^{\lambda,eff}, D_{MEM\_CLc}^{\lambda,eff}$$

are the effective conservation of membrane water coefficients between the anode catalytic layer and the proton exchange membrane and between the cathode catalytic layer and the proton exchange membrane respectively, $\delta_{CLa}$, $\delta_{MEM}$, $\delta_{CLc}$ are the thickness of the anode catalytic layer, the proton exchange membrane and the cathode catalytic layer, $\rho_{MEM}$ is the proton exchange membrane density, EW is the equivalent weight of proton exchange membrane, Δt is the time step, $\omega_{CLa}$, $\omega_{MEM}$, $\omega_{CLc}$ are the volume fractions of ionomer of the anode catalytic layer, proton exchange membrane, cathode catalytic layer, I is current density, F is the Faraday's constant, and $S_{mw}$, is the membrane water source term.

Compared with the prior art, the discretization modeling method for the electro-osmotic drag effect of water conservation in a fuel cell in the present disclosure can perform a discretization and a numerical simulation for a complete electro-osmotic drag effect, the discretization comprising a water conservation portion caused by a membrane water content gradient and a water conservation portion caused by a proton transport flux gradient. Thus, it solves the problem that the solution of the water conversation in the fuel cell caused by ignoring the above-mentioned latter in the existing simulation model is not accurate, improves the reliability of the simulation technology of the fuel cell, and greatly reduces the experimental cost and the product development cycle.

Specifically, the technical effects are as follows: (1) the discretization modeling method for the electro-osmotic drag effect of water conservation in a fuel cell in the present disclosure can perform a discretization and a numerical calculation for a complete electro-osmotic drag effect, the discretization comprising a water conservation portion caused by a membrane water content gradient and a water conservation portion caused by a proton transport flux gradient. Thus, it solves the problem that the solution of the water conversation in the fuel cell caused by ignoring the above-mentioned latter in the existing simulation model is not accurate. (2) The discretization modeling method for the electro-osmotic drag effect of water conservation in a fuel cell in the present disclosure can solve the problem that the electro-osmotic drag effect in the fuel cell in operation could not be measured by test methods. Thus, it improves the reliability of the simulation technology of the fuel cell, and greatly reduces the experimental cost and the product development cycle.

DESCRIPTION OF DRAWINGS

The drawings forming a part of the present disclosure are intended to provide a further understanding of the present disclosure, and the illustrative embodiments of the present disclosure and the description thereof are intended to explain the present disclosure and do not constitute an undue limitation of the present disclosure. In the drawings.

DETAILED DESCRIPTION

Figures 1, 2:
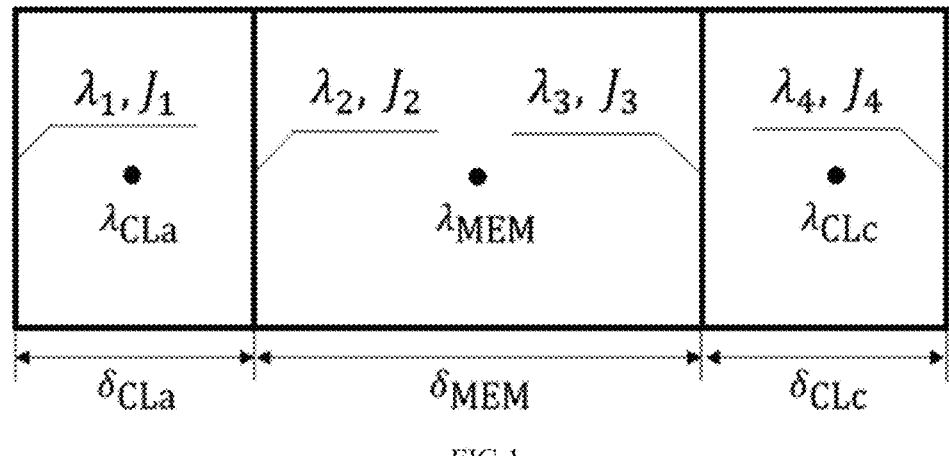
FIG. 1 is a schematic diagram of a discretization of a discretization modeling method of the electro-osmotic drag effect of water conservation in a fuel cell according to an embodiment of the present disclosure.
FIG. 2 illustrates a comparison of the electro-osmotic drag effect in the anode catalytic layer by, the discretization modeling method of the electro-osmotic drag effect of water conservation in a fuel cell according to an embodiment of the present disclosure with simplified results of the existing model.

Exemplary embodiments of the present disclosure will be described in more details below with reference to the accompanying drawings. While exemplary embodiments of the disclosure are shown in the drawings, it should be understood that the disclosure may be embodied in various forms and should not be limited to the embodiments set forth herein. On the contrary, these embodiments are provided so that this disclosure will be understood more thoroughly, and will fully convey the scope of the disclosure to those people skilled in the art.

The specific steps of the present method are described below with reference to specific embodiments and drawings.

FIG. 1 is a schematic diagram of a discretization of a discretization modeling method of the electro-osmotic drag effect of water conservation in a fuel cell according to an embodiment of the present disclosure.

Refer to FIG. 1, the discretization of the discretization modeling method in this disclosure is directed to a structure composed of an anode catalytic layer, a proton exchange membrane, and a cathode catalytic layer.

Specifically in the embodiment, a thickness of the anode catalytic layer is 0.01 mm, a thickness of the proton exchange membrane is 0.025 mm, and a thickness of the cathode catalytic layer is 0.01 mm.

A volume fraction of ionomer in the anode catalytic layer is 0.4, the volume fraction of ionomer in the proton exchange membrane is 1.0, and the volume fraction of ionomer in the cathode catalytic layer is 0.4.

Equivalent weight of proton exchange membrane is 1.1 kg $mol^{-1}$.

Phase change rate between the membrane water and water vapor is 1.0 $s^{-1}$, and phase change rate between the membrane water and liquid water is 1.0 $s^{-1}$.

Faraday's constant is 96487 C $mol^{-1}$.

Operating current density is 1.0 A $cm^{-2}$.

Initial membrane water content at the center of the anode catalytic layer, the proton exchange membrane and the cathode catalytic layer are 6.2, 6.2, 6.2, respectively. Initial temperature in the fuel cell is 20° C. Gas inlet temperature of the cathode and anode is 80° C. Relative humidity of gas inlet of the cathode and anode are 100%.

Time step is 0.1 s.

The time period from 49.9 s to 50.0 s is selected below for the illustration of this embodiment.

A discretization modeling method for electro-osmotic drag effect of water conservation in a fuel cell according to the present disclosure comprises:

S1, establishing a conservation equation of membrane water in the fuel cell;

S2, performing a discretization for a complete electro-osmotic drag effect, the discretization comprising a water conservation portion caused by a membrane water content gradient and a water conservation portion caused by a proton transport flux gradient;

S3, obtaining a discretization simulation model of the complete electro-osmotic drag effect based on results of the discretization in S2;

S4, solving the conservation equation of membrane water to establish a discretization simulation model of electro-osmotic drag effect of water conservation in the fuel cell.

FIGS. 2-7 are the effects of the discretization modeling method for the electro-osmotic drag effect of water conservation in a fuel cell in the embodiment.

(1) S1, establishing the conservation equation of membrane water in the fuel cell:

$$\frac{\rho_{mem}}{EW}\frac{\partial(\omega\lambda)}{\partial t} + \nabla\cdot\left(n_d\frac{J_{ion}}{F}\right) = \frac{\rho_{mem}}{EW}\nabla\cdot\left(\omega^{1.5}D_{mw}\nabla\lambda\right) + S_{mw}$$

where $\rho_{MEM}$ is a proton exchange membrane density, EW is an equivalent weight of proton exchange membrane, $\omega$ is a volume fraction of ionomer, $\lambda$ is membrane water content, t is time, $n_d$ is an electro-osmotic drag coefficient, $J_{ion}$ is a proton transport flux, F is a Faraday's constant, $D_{mw}$ is a membrane water diffusivity coefficient and $S_{mw}$ is a membrane water source term.

The calculation expression of the membrane water source term is as follows:

$$S_{mw} = \begin{cases} S_{react} - S_{m-v} - S_{m-1} & \text{(cathode catalytic layer)} \\ -S_{m-v} - S_{m-1} & \text{(anode catalytic layer)} \end{cases}$$

where $S_{mw}$ is a membrane water source term, $S_{react}$ is a water source term of electrochemical reaction product $S_{m-v}$ is a phase change source term between membrane water and water vapor and $S_{m-1}$ is a phase change source term between membrane water and liquid water.

The calculation expressions of the water source term of electrochemical reaction product, the phase change source term and a source term of hydraulic permeation effect are as follows:

$$S_{react} = \frac{I}{2F\delta_{CLc}}$$

$$S_{m-v} = \xi_{mv} \frac{\rho_{MEM}}{EW}(\lambda - \lambda_{eq})$$

$$S_{m-1} = \begin{cases} \xi_{ml} \frac{\rho_{MEM}}{EW}(\lambda - \lambda_{sat}) & (\lambda > \lambda_{sat}) \\ 0 & (\lambda < \lambda_{sat}) \end{cases}$$

where I is current density, F is the Faraday's constant, $\delta_{CLa}$, $\delta_{MEM}$, $\delta_{CLc}$ are the thickness of the anode catalytic layer, the proton exchange membrane, and the cathode catalytic layer, respectively, $\xi_{mv}$, $\xi_{ml}$ are the phase change rate between the membrane water and water vapor and the phase change rate between the membrane water and liquid water, $\rho_{MEM}$ is the proton exchange membrane density, EW is the equivalent weight of proton exchange membrane, $\lambda$ is the membrane water content, $\lambda_{eq}$ is the equilibrium membrane water content and $\lambda_{sat}$ is the saturated membrane water content.

The calculation expressions of the equilibrium membrane water content and the saturated membrane water content are as follows:

$$a = \frac{p_{vp}}{p_{sat}}$$

$$\lambda_{eq} = \begin{cases} 0.043 + 17.81a - 39.85a^2 + 36.0a^3 & (0 \le a < 1) \\ 14.0 + 1.4(a-1) & (1 < a \le 3) \end{cases}$$

$$\lambda_{sat} = \begin{cases} 4.837 & (T \le 223.15) \\ [-1.304 + 0.01479T - 3.594 \times 10^{-5}T^2]^{-1} & (223.15 \le T < T_N) \\ 14.0 & (T \ge T_N) \end{cases}$$

At the time of 49.9 s, the membrane water content at the center of the anode catalytic layer, the proton exchange membrane, and the cathode catalytic layer are 10.828, 13.722, 17.031, respectively, and the temperatures at the central of the anode catalytic layer, the proton exchange membrane, and the cathode catalytic layer are 354.198 K, 354.259 K, 354.318 K, respectively.

It is calculated that at the time of 49.9 s, the water source term of electrochemical reaction product is 5.182 kmol m$^{-3}$ s$^{-1}$, the phase change source term between the anode membrane water and water vapor is $-3.104$ kmol m$^{-3}$ s$^{-1}$, the phase change source term between the cathode membrane water and water vapor is $4.222$ kmol m$^{-3}$ s$^{-1}$, the phase change source term between the anode membrane water and liquid water is 0, and the phase change source term between the cathode membrane water and liquid water is $4.222$ kmol m$^{-3}$ s$^{-1}$. Therefore, the membrane water source terms for the anode catalytic layer and the cathode catalytic layer are $3.104$ kmol m$^{-3}$ s$^{-1}$ and $-3.262$ kmol m$^{-3}$ s$^{-1}$, respectively.

(2) S2, performing a discretization for a complete electro-osmotic drag effect, the discretization comprising a water conservation portion caused by a membrane water content gradient and a water conservation portion caused by a proton transport flux gradient; and S3, obtaining a discretization simulation model of the complete electro-osmotic drag effect based on results of the discretization in S2.

Figure 3:
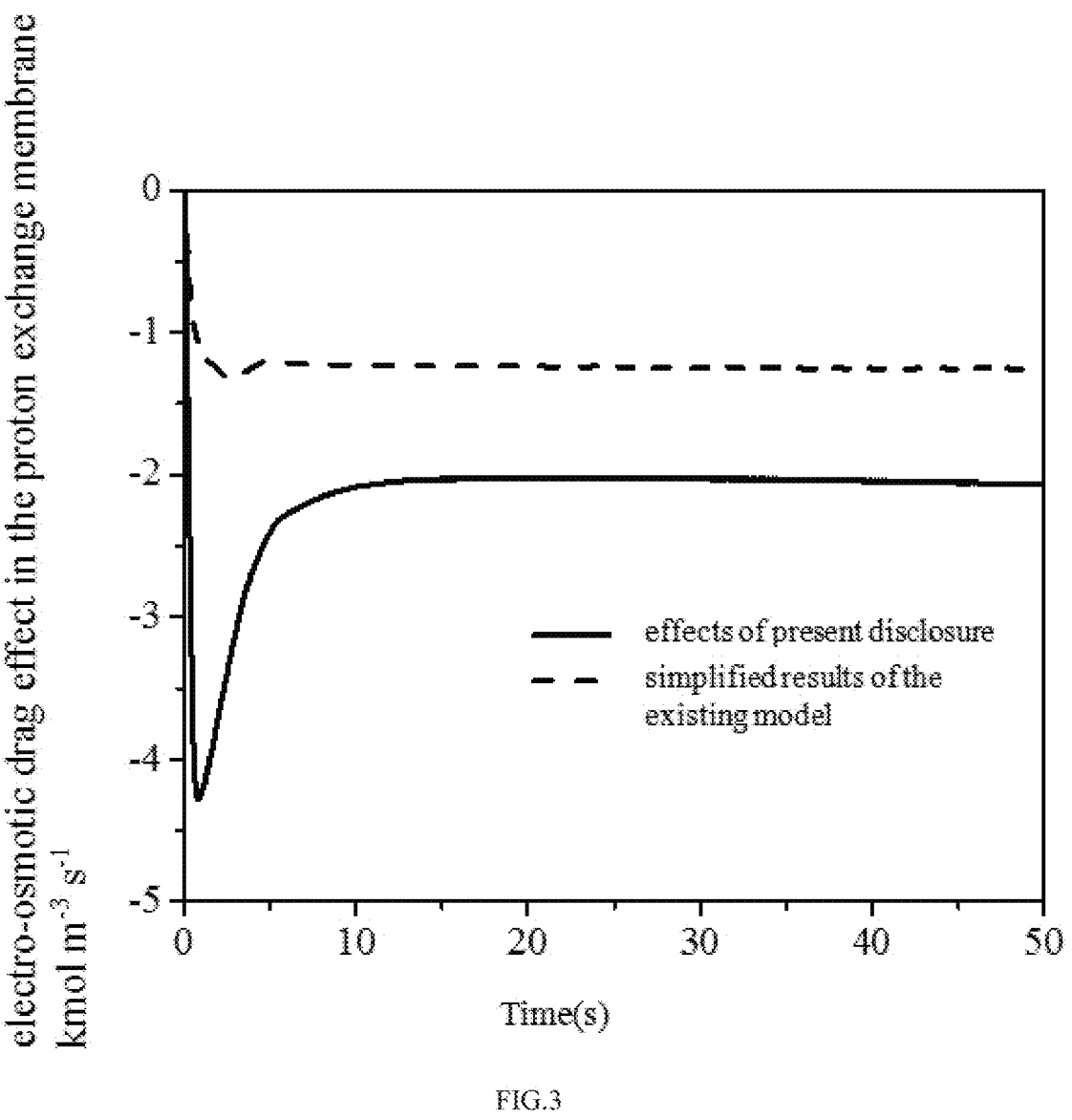
FIG. 3 illustrates a comparison of the electro-osmotic drag effect in the proton exchange membrane by the discretization modeling method of the electro-osmotic drag effect of water conservation in a fuel cell according to an embodiment of the present disclosure with simplified results of the existing model.
Figure 4:
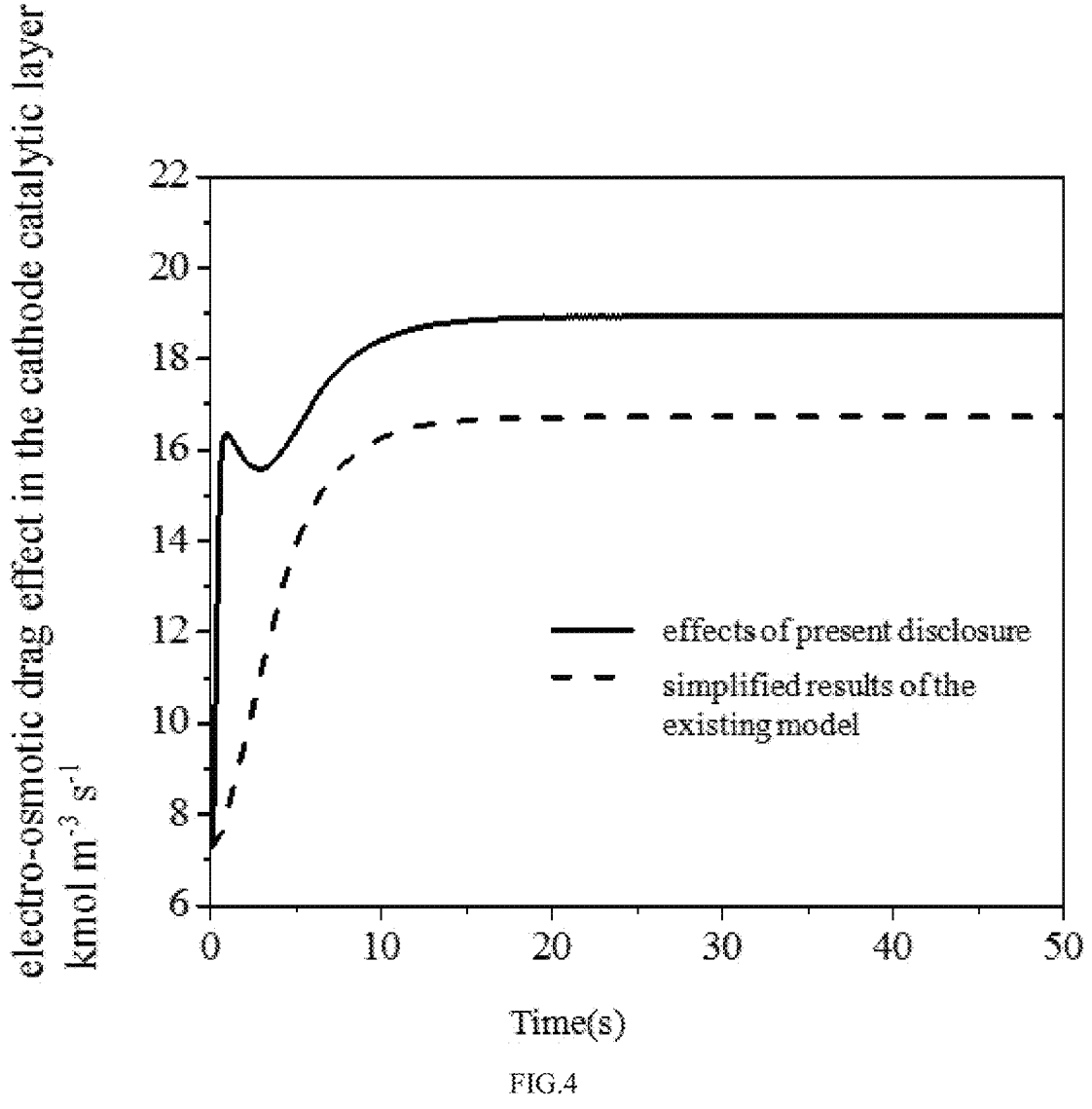
FIG. 4 illustrates a comparison of the electro-osmotic drag effect in the cathode catalytic layer by the discretization modeling method of the electro-osmotic drag effect of water conservation in a fuel cell according to an embodiment of the present disclosure with simplified results of the existing model.

FIGS. 2-4 illustrate a comparison of the electro-osmotic drag effect in the anode catalytic layer with the simplified results of the existing model, a comparison of the electro-osmotic drag effect in the anode catalytic layer with simplified results of the existing model, a comparison of the electro-osmotic drag effect in the proton exchange membrane with simplified results of the existing model and a comparison of the electro-osmotic drag effect in the cathode catalytic layer with simplified results of the existing model, respectively.

The performing a discretization for a complete electro-osmotic drag effect comprises: performing a discretization for a complete electro-osmotic drag effect; performing a discretization for the water conservation portion caused by the membrane water content gradient; performing a discretization for the water conservation portion caused by the proton transport flux gradient.

The equation of the discretization for the electro-osmotic drag effect is as follows:

$$\nabla \cdot \left( n_d \frac{J_{ion}}{F} \right) = \frac{1}{F} \left( J_{ion} \frac{\partial n_d}{\partial x} + n_d \frac{\partial J_{ion}}{\partial x} \right)$$

$$n_d = \frac{2.5\lambda}{22}$$

where $n_d$ is the electro-osmotic drag coefficient, $J_{ion}$ is the proton transport flux, F is the Faraday's constant, x is the through-plane direction, $\lambda$ is the membrane water content, $$\frac{1}{F}\left( J_{ion} \frac{\partial n_d}{\partial x} \right)$$

is the water conservation portion caused by a membrane water content gradient, and $$\frac{1}{F}\left( n_d \frac{\partial J_{ion}}{\partial x} \right)$$

is the water conservation portion caused by a proton transport flux gradient.

For the water conservation portion caused by the membrane water content gradient, the calculation expression is as follows:

$$\begin{cases} \dfrac{1}{F}\left(J_{ion}\dfrac{\partial n_d}{\partial x}\right) \;\Big|_{CLa} \;=\; \dfrac{2.5}{22F}\left(J_{ion}^{CLa}\dfrac{\lambda_2 - \lambda_1}{\delta_{CLa}}\right) \\[2mm] \dfrac{1}{F}\left(J_{ion}\dfrac{\partial n_d}{\partial x}\right) \;\Big|_{MEM} \;=\; \dfrac{2.5}{22F}\left(J_{ion}^{MEM}\dfrac{\lambda_3 - \lambda_2}{\delta_{MEM}}\right) \\[2mm] \dfrac{1}{F}\left(J_{ion}\dfrac{\partial n_d}{\partial x}\right) \;\Big|_{CLc} \;=\; \dfrac{2.5}{22F}\left(J_{ion}^{CLc}\dfrac{\lambda_4 - \lambda_3}{\delta_{CLc}}\right) \end{cases}$$

where F is a Faraday's constant, $$J_{ion}^{CLa}, J_{ion}^{MEM}, J_{ion}^{CLc}$$

are the proton transport flux in the anode catalytic layer, the proton exchange membrane, and the cathode catalytic layer, respectively; $\delta_{CLa}$, $\delta_{MEM}$, $\delta_{CLc}$ are thickness of the anode catalytic layer, the proton exchange membrane, and the cathode catalytic layer, respectively; $\lambda_1$, $\lambda_2$, $\lambda_3$, $\lambda_4$ are the membrane water content at the left boundary of the anode catalytic layer, at the interface between the anode catalytic layer and the proton exchange membrane, at the interface between the proton exchange membrane and the cathode catalytic layer, and at the right boundary of the cathode catalytic layer.

The calculation expressions of the proton transport flux in the anode catalytic layer, the proton exchange membrane, and the cathode catalytic layer are as follows:

$$\begin{cases} J_{ion}^{CLa} = \dfrac{J_1 + J_2}{2} \\[2mm] J_{ion}^{MEM} = \dfrac{J_2 + J_3}{2} \\[2mm] J_{ion}^{CLc} = \dfrac{J_3 + J_4}{2} \end{cases}$$

where, $J_1$, $J_2$, $J_3$, $J_4$ are the proton transport flux at the left boundary of the anode catalytic layer, at the interface between the anode catalytic layer and the proton exchange membrane, at the interface between the proton exchange membrane and the cathode catalytic layer, and at the right boundary of the cathode catalytic layer.

Since protons are generated in the anode catalytic layer and are consumed in transmission to the cathode catalytic layer, the proton transport flux at the left boundary of the anode catalytic layer and the right boundary of the cathode catalytic layer are all equal to 0. Since there is no generation or consumption during conservation in the proton exchange membrane, the proton transport flux at the interface between the anode catalytic layer and the proton exchange membrane and the interface between the proton exchange membrane and the cathode catalytic layer are equal, and the expressions are as follows:

$$\begin{cases} J_1, \;\; J_4 = 0 \\ J_2, \;\; J_3 = I \end{cases}$$

where I is current density.

The membrane water content at the left boundary of the anode catalytic layer, the interface between the anode catalytic layer and the proton exchange membrane, the interface between the proton exchange membrane and the cathode catalytic layer, and the right boundary of cathode catalytic layer, are solved by linear interpolation, and the calculation expressions are as follows:

$$\begin{cases} \lambda_1 = \lambda_{CLa} - \dfrac{\lambda_{MEM} - \lambda_{CLa}}{\delta_{MEM} + \delta_{CLa}}\delta_{CLa} \\[2mm] \lambda_2 = \lambda_{CLa} + \dfrac{\lambda_{MEM} - \lambda_{CLa}}{\delta_{MEM} + \delta_{CLa}}\delta_{CLa} \\[2mm] \lambda_3 = \lambda_{MEM} + \dfrac{\lambda_{CLc} - \lambda_{MEM}}{\delta_{CLc} + \delta_{MEM}}\delta_{MEM} \\[2mm] \lambda_4 = 2\lambda_{CLc} - \lambda_{MEM} - \dfrac{\lambda_{CLc} - \lambda_{MEM}}{\delta_{CLc} + \delta_{MEM}}\delta_{MEM} \end{cases}$$

At the time of 49.9 s, the membrane water content at the center of the anode catalytic layer, the proton exchange membrane, and the cathode catalytic layer are 10.828, 13.722 and 17.031, respectively.

It is calculated that at the time of 49.9 s, the proton transport flux in the anode catalytic layer, the proton exchange membrane and the cathode catalytic layer are 5000 A m$^{-2}$, 10000 A m$^{-2}$ and 5000 A m$^{-2}$, respectively. Thus the water conservation portions caused by the membrane water content gradient in the anode catalytic layer, the proton exchange membrane and the cathode catalytic layer are calculated to be −0.963 kmol m$^{-3}$ s$^{-1}$, 2.064 kmol m$^{-3}$ s$^{-1}$ and −2.796 kmol m$^{-3}$ s$^{-1}$, respectively.

The calculation expressions of the water conservation portion caused by the proton transport flux gradient are as follows:

$$\begin{cases} \dfrac{1}{F}\left(n_d\dfrac{\partial J_{ion}}{\partial x}\right) \;\Big|_{CLa} \;=\; \dfrac{2.5}{22F}\left(\lambda_{CLa}\dfrac{J_2 - J_1}{\delta_{CLa}}\right) \\[2mm] \dfrac{1}{F}\left(n_d\dfrac{\partial J_{ion}}{\partial x}\right) \;\Big|_{MEM} \;=\; \dfrac{2.5}{22F}\left(\lambda_{MEM}\dfrac{J_a - J_2}{\delta_{MEM}}\right) \\[2mm] \dfrac{1}{F}\left(n_d\dfrac{\partial J_{ion}}{\partial x}\right) \;\Big|_{CLc} \;=\; \dfrac{2.5}{22F}\left(\lambda_{CLc}\dfrac{J_4 - J_3}{\delta_{CLc}}\right) \end{cases}$$

where $\lambda_{CLa}$, $\lambda_{MEM}$, $\lambda_{CLc}$ are the membrane water content at the center of the anode catalytic layer, the proton exchange membrane, and the cathode catalytic layer, respectively.

At the time of 49.9 s, the membrane water content at the center of the anode catalytic layer, the proton exchange membrane, and the cathode catalytic layer are 10.828, 13.722 and 17.031, respectively.

It is calculated that at the time of 49.9 s, the water conservation portions caused by proton transport flux gradient in the anode catalytic layer, the proton exchange membrane and the cathode catalytic layer are −12.753 kmol m$^{-3}$ s$^{-1}$, 0 kmol m$^{-3}$ s$^{-1}$ and −16,161 kmol m$^{-3}$ s$^{-1}$, respectively;

It is thus calculated that at the time of 49.9 s, the complete electro-osmotic drag effect in the anode catalytic layer, the proton exchange membrane and the cathode catalytic layer are 13.716 kmol m$^{-3}$ s$^{-1}$, 2.064 kmol m$^{-3}$ s$^{-1}$ and −18.957 kmol m$^{-3}$ s$^{-1}$, respectively.

It can be seen from the above simulation expressions and the drawings that the absolute value of the electro-osmotic drag effect in the simulation result is lower than the absolute value of the complete electro-osmotic drag effect calculated in the present disclosure because the existing model simplifies the electro-osmotic drag effect.

(3) S4, solving the conservation equation of membrane water to establish a discretization simulation model of electro-osmotic drag effect of water conservation in a fuel cell.

Figure 5:
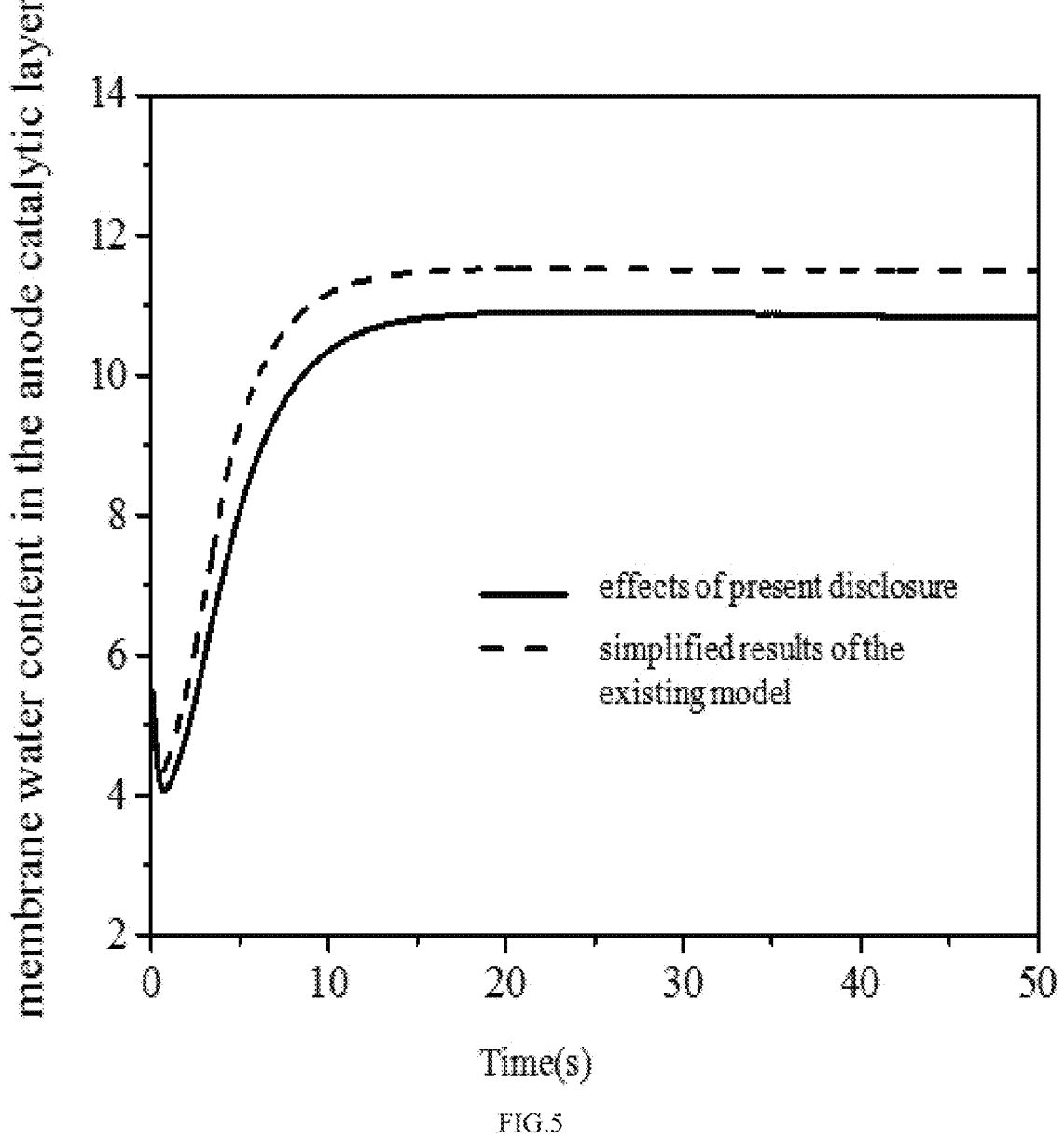
FIG. 5 illustrates a comparison of the membrane water content in the anode catalytic layer by the discretization modeling method of the electro-osmotic drag effect of water conservation in a fuel cell according to an embodiment of the present disclosure with simplified results of the existing model.
Figure 6:
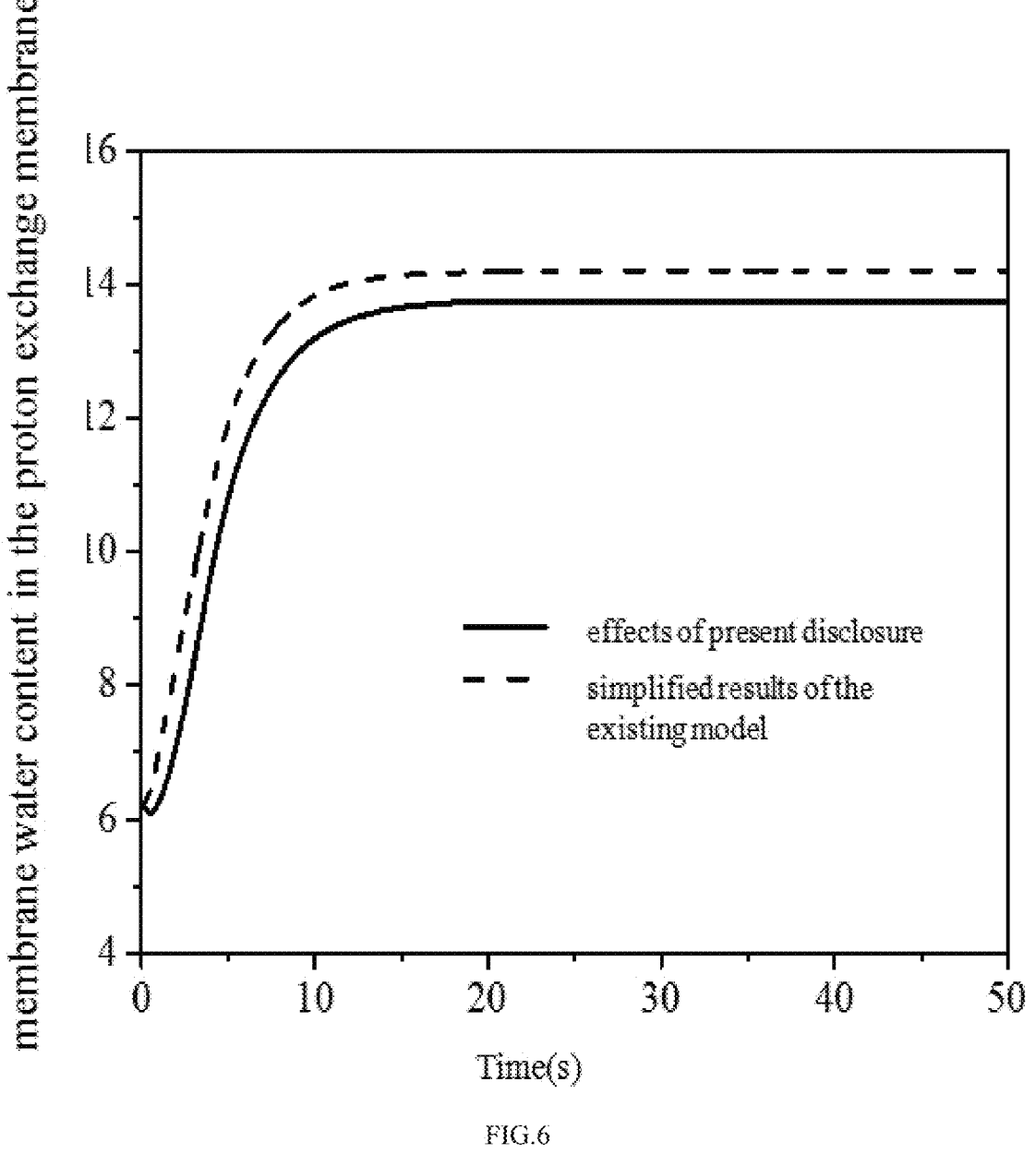
FIG. 6 illustrates a comparison of the membrane water content in the proton exchange membrane by the discretization modeling method of the electro-osmotic drag effect of water conservation in a fuel cell according to an embodiment of the present disclosure with simplified results of the existing model.
Figure 7:
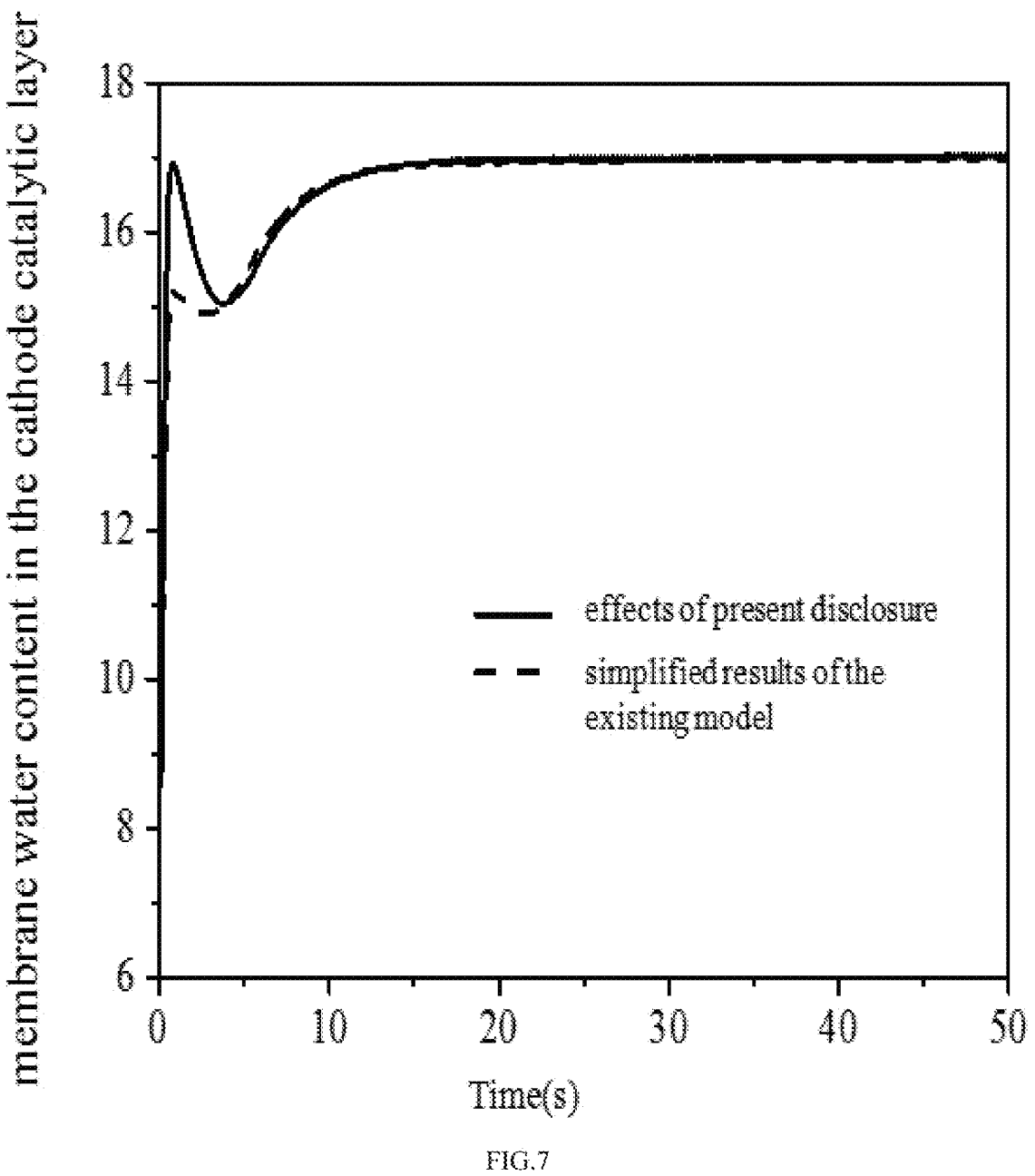
FIG. 7 illustrates a comparison of the membrane water content in the cathode catalytic layer by the discretization modeling method of the electro-osmotic drag effect of water conservation in a fuel cell according to an embodiment of the present disclosure with simplified results of the existing model.

FIGS. 5-7 illustrate a comparison of the membrane water content in the anode catalytic layer with simplified results of the existing model, a comparison of the membrane water content in the proton exchange membrane with simplified results of the existing model, a comparison of the membrane water content in the cathode catalytic layer with simplified results of the existing model respectively.

$$\lambda_{CLa}^{t} = \lambda_{CLa}^{t-\Delta t} +$$

$$\left( \frac{(\lambda_{MEM}^{t-\Delta t} - \lambda_{CLa}^{t-\Delta t})D_{MEM\_CLa}^{\lambda,eff}}{\left(\frac{\delta_{CLa}}{2} + \frac{\delta_{MEM}}{2}\right)\delta_{CLa}} + \left(-\frac{2.5I}{22F}\left(\frac{\lambda_{MEM}^{t-\Delta t} - \lambda_{CLa}^{t-\Delta t}}{\delta_{MEM} + \delta_{CLa}} + \frac{\lambda_{CLa}^{t-\Delta t}}{\delta_{CLa}}\right) + S_{mw}\right)\frac{EW}{\rho_{MEM}}\right)\frac{\Delta t}{\omega_{CLa}}$$

$$\lambda_{MEM}^{t} = \lambda_{MEM}^{t-\Delta t} + \left( \frac{(\lambda_{CLc}^{t-\Delta t} - \lambda_{MEM}^{t-\Delta t})D_{MEM\_CLc}^{\lambda,eff}}{\left(\frac{\delta_{CLc}}{2} + \frac{\delta_{MEM}}{2}\right)\delta_{MEM}} - \frac{(\lambda_{MEM}^{t-\Delta t} - \lambda_{CLa}^{t-\Delta t})D_{MEM\_CLa}^{\lambda,eff}}{\left(\frac{\delta_{CLa}}{2} + \frac{\delta_{MEM}}{2}\right)\delta_{MEM}} - \right.$$

$$\left. \frac{2.5I}{22F}\left(\frac{\lambda_{MEM}^{t-\Delta t}\delta_{CLc} + \lambda_{CLc}^{t-\Delta t}\delta_{MEM}}{\delta_{MEM}(\delta_{MEM} + \delta_{CLc})} - \frac{\lambda_{CLa}^{t-\Delta t}\delta_{MEM} + \lambda_{MEM}^{t-\Delta t}\delta_{CLa}}{\delta_{MEM}(\delta_{MEM} + \delta_{CLa})}\right)\frac{EW}{\rho_{MEM}}\right)\frac{\Delta t}{\omega_{MEM}}$$

$$\lambda_{CLc}^{t} = \lambda_{CLc}^{t-\Delta t} + \left(-\frac{(\lambda_{CLc}^{t-\Delta t} - \lambda_{MEM}^{t-\Delta t})D_{MEM\_CLc}^{\lambda,eff}}{\left(\frac{\delta_{CLc}}{2} + \frac{\delta_{MEM}}{2}\right)\delta_{CLc}} + \right.$$

$$\left. \left(\frac{2.5I}{22F}\left(\frac{\lambda_{MEM}^{t-\Delta t}}{\delta_{CLc}} + \frac{\lambda_{CLc}^{t-\Delta t} - \lambda_{MEM}^{t-\Delta t}}{\delta_{MEM} + \delta_{CLc}}\frac{\delta_{MEM}}{\delta_{CLc}}\right) + S_{mw}\right)\frac{EW}{\rho_{MEM}}\right)\frac{\Delta t}{\omega_{CLc}}$$

where $$\lambda_{CLa}^{t}, \lambda_{MEM}^{t}, \lambda_{CLc}^{t}$$

are the membrane water content at the center of the anode catalytic layer; the proton exchange membrane and the cathode catalytic layer respectively at the time of t;

$$\lambda_{CLa}^{t-\Delta t}, \lambda_{MEM}^{t-\Delta t}, \lambda_{CLc}^{t-\Delta t}$$

correspond to the membrane water content at the center of the anode catalytic layer, the proton exchange membrane and the cathode catalytic layer respectively at the time of t−Δt;

$$D_{MEM\_CLa}^{\lambda,eff}, D_{MEM\_CLc}^{\lambda,eff}$$

are the effective conservation coefficients of membrane water between the anode catalytic layer and the proton exchange membrane, and between the cathode catalytic layer and the proton exchange membrane, respectively; $\delta_{CLa}$, $\delta_{MEM}$, $\delta_{CLc}$ are the thickness of the anode catalytic layer, the proton exchange membrane and the cathode catalytic layer; $\rho_{MEM}$ is the proton exchange membrane density; EW is the equivalent weight of proton exchange membrane; Δt is the time step; $\omega_{CLa}$, $\omega_{MEM}$, $\omega_{CLc}$ are the volume fractions of ionomer of the anode catalytic layer, the proton exchange membrane, and the cathode catalytic layer; I is the current density F is the Faraday's constant and $S_{mw}$ is the membrane water source term.

At the time of 49.9 s, the membrane water content at the center of the anode catalytic layer, the proton exchange membrane, and the cathode catalytic layer are 10.828, 13.722 and 17.031, respectively; temperatures at the center of the anode catalytic layer, proton exchange membrane, cathode catalytic layer are 354.198 K, 354.259 K and 354.318 K, respectively. Thus, the effective membrane water diffusivity coefficients $$D_{MEM\_CLa}^{\lambda,eff}, D_{MEM\_CLc}^{\lambda,eff}$$

between the anode catalytic layer and the proton exchange membrane and between the proton exchange membrane and the cathode catalytic layer are calculated to be $3.551\times10^{-10}$ m$^2$ s$^{-1}$ and $4.683\times10^{-10}$ m$^2$ s$^{-1}$ respectively by the following expressions.

$$D_{mw} = \begin{cases} 3.1\times10^{-7}\lambda[\exp(0.28\lambda) - 1]\exp\left(\frac{-2346}{T}\right)(0 < \lambda \le 3) \\ 4.17\times10^{-8}\lambda[161\exp(-\lambda) + 1]\exp\left(\frac{-2346}{T}\right)(3 < \lambda \le 17) \end{cases}$$

$$D_{mw}^{eff} = \omega^{1.5}D_{mw}$$

$$D_{MEM\_CLa}^{\lambda,eff} = \frac{\frac{\delta_{CLa}}{2} + \frac{\delta_{MEM}}{2}}{\frac{\delta_{CLa}}{2}{(D_{CLa}^{\lambda,eff})} + \frac{\delta_{MEM}}{2}{(D_{MEM}^{\lambda,eff})}}$$

$$D_{MEM\_CLc}^{\lambda,eff} = \frac{\frac{\delta_{CLc}}{2} + \frac{\delta_{MEM}}{2}}{\frac{\delta_{CLc}}{2}{(D_{CLc}^{\lambda,eff})} + \frac{\delta_{MEM}}{2}{(D_{MEM}^{\lambda,eff})}}$$

It is calculated that the membrane water content at the center of the anode catalytic layer, the proton exchange membrane, and the cathode catalytic layer are 10.816, 13.724 and 17.011 respectively at the time of 50.0 s.

It can be seen from the above simulation expressions and the drawings that the absolute value of the electro-osmotic drag effect in the existing model simulation processing result is lower than the absolute value of the complete electro-osmotic drag effect calculated in the present disclosure, so that the membrane water content in the calculation result of the existing model is higher than the membrane water content calculated in the model of the present disclosure.

In the present disclosure, it performs a discretization and a numerical calculation for a complete electro-osmotic drag effect, the discretization comprising a water conservation portion caused by a membrane water content gradient and a water conservation portion caused by a proton transport flux gradient. Thus, it solves the problem that the solution of the water conversation in the fuel cell caused by ignoring the above-mentioned latter in the existing simulation model is not accurate, improves the reliability of the simulation technology of the fuel cell, and greatly reduces the experimental cost and the product development cycle.

Flow diagrams are used in the present disclosure to illustrate steps of methods in accordance with embodiments of the present disclosure. It should be understood that the preceding or following steps are not necessarily performed exactly in order. On the contrary, various steps may be handled in reverse order or simultaneously. At the same time, other operations may also be added to these processes.

Those of ordinary skills in the art will appreciate that all or part of the steps of the above-described methods may be completed by a computer program that instructs associated hardware, and the program may be stored in a computer-readable storage medium, such as read only memory, magnetic disk, optical disc, or the like. Optionally, all or part of steps of the above-described embodiments may also be implemented using one or more integrated circuits. Accordingly, the modules/units in the above-described embodiments may be implemented in the form of hardware as well as software functional modules. The present disclosure is not limited to any particular form of combination of hardware and software.

Unless otherwise, all terms used herein have the same meaning as commonly understood by one of ordinary skills in the art to which this disclosure belongs. It will be further understood that terms, such as those in commonly used dictionaries, should be interpreted as having a meaning that is consistent with their meaning in the context of the relevant art and will not be interpreted in an idealized or highly formal sense unless it is clearly defined here in this way.

The foregoing is illustrative of the present disclosure, and is not to be construed as limiting thereof. Although several exemplary embodiments of this disclosure have been described, those skilled in the art will readily appreciate that many modifications are possible in the exemplary embodiments without departing from the novel teachings and advantages of this disclosure. Accordingly, all such modifications are intended to be included within the scope of this disclosure as in the claims. It is to be understood that the foregoing is illustrative of the present disclosure and is not to be considered limited to the specific embodiments disclosed, and that modifications to the disclosed embodiments, as well as other embodiments, are intended to be included within the scope of the appended claims. The present disclosure is by the claims and their equivalents.

In the description of the present specification, reference to the terms "an embodiment," "some embodiments," "illustrative embodiment," "an example," "a particular example," or "some examples" or the like means that a particular feature, structure, material, or characteristic described in connection with the embodiment or example is included in at least one embodiment or example of the present disclosure. In this description, illustrative expressions of such terms do not necessarily refer to the same embodiment or example. Furthermore, the particular features, structures, materials, or characteristics described may be combined in any suitable manner in any one or more embodiments or examples.

The foregoing description is merely illustrative of the preferred embodiments of the present disclosure and is not intended to limit the present disclosure, and any modifications, equivalents, improvements, and the like within the spirit and principles of the present disclosure are intended to be included within the scope of the present disclosure.

What is claimed is:

1. A discretization modeling method for electro-osmotic drag effect of water conservation in a fuel cell, wherein the fuel cell includes an anode catalytic layer, a proton exchange membrane, and a cathode catalytic layer, and the discretization modeling method comprises:

S1, establishing a conservation equation of membrane water in the fuel cell;

S2, performing a discretization for a complete electro-osmotic drag effect;

S3, obtaining a discretization simulation model of the complete electro-osmotic drag effect based on results of the discretization in S2;

S4, solving the conservation equation of membrane water to establish a discretization simulation model of an electro-osmotic drag effect of water conservation in the fuel cell;

S5, obtaining, based on the discretization simulation model of the electro-osmotic drag effect of water conservation in the fuel cell, an electro-osmotic drag effect of the anode catalytic layer, an electro-osmotic drag effect of the proton exchange membrane, and an electro-osmotic drag effect of the cathode catalytic layer to characterize the electro-osmotic drag effects of the anode catalytic layer, the proton exchange membrane, and the cathode catalytic layer of the fuel cell in operation;

performing the discretization for the complete electro-osmotic drag effect comprising: performing a discretization for a water conservation portion caused by a membrane water content gradient and performing a discretization for a water conservation portion caused by a proton transport flux gradient;

for the water conservation portion caused by the membrane water content gradient, calculation expressions are as follows:

$$
\begin{cases}
\dfrac{1}{F}\left(J_{ion}\dfrac{\partial n_d}{\partial x}\right)\Big|_{CLa} = \dfrac{2.5}{22F}\left(J_{ion}^{CLa}\dfrac{\lambda_2-\lambda_1}{\delta_{CLa}}\right) \\[2mm]
\dfrac{1}{F}\left(J_{ion}\dfrac{\partial n_d}{\partial x}\right)\Big|_{MEM} = \dfrac{2.5}{22F}\left(J_{ion}^{MEM}\dfrac{\lambda_3-\lambda_2}{\delta_{MEM}}\right) \\[2mm]
\dfrac{1}{F}\left(J_{ion}\dfrac{\partial n_d}{\partial x}\right)\Big|_{CLc} = \dfrac{2.5}{22F}\left(J_{ion}^{CLc}\dfrac{\lambda_4-\lambda_3}{\delta_{CLc}}\right)
\end{cases}
\tag{8}
$$

where F is the Faraday's constant;

$$
\dfrac{1}{F}\left(J_{ion}\dfrac{\partial n_d}{\partial x}\right)\Big|_{CLa}, \; \dfrac{1}{F}\left(J_{ion}\dfrac{\partial n_d}{\partial x}\right)\Big|_{MEM},
$$

and $$
\dfrac{1}{F}\left(J_{ion}\dfrac{\partial n_d}{\partial x}\right)\Big|_{CLc}
$$

are the water conservation portions caused by the membrane water content gradient in the anode catalytic layer, the proton exchange membrane, and the cathode catalytic layer, respectively;

$$
J_{ion}^{CLa}, \; J_{ion}^{MEM}, \; J_{ion}^{CLc}
$$

are the proton transport flux in the anode catalytic layer, the proton exchange membrane, and the cathode catalytic layer, respectively; $\delta_{CLa}$, $\delta_{MEM}$, $\delta_{CLc}$ are thickness of the anode catalytic layer, the proton exchange membrane, and the cathode catalytic layer, respectively; $\lambda_1$, $\lambda_2$, $\lambda_3$, $\lambda_4$ are the membrane water content at the left boundary of the anode catalytic layer, at the interface between the anode catalytic layer and the proton exchange membrane, at the interface between the proton exchange membrane and the cathode catalytic layer, and at the right boundary of the cathode catalytic layer;

calculation expressions of the proton transport flux in the anode catalytic layer, the proton exchange membrane, and the cathode catalytic layer are as follows:

$$\begin{cases} J_{ion}^{CLa} = \dfrac{J_1 + J_2}{2} \\ J_{ion}^{MEM} = \dfrac{J_2 + J_3}{2} \\ J_{ion}^{CLc} = \dfrac{J_3 + J_4}{2} \end{cases} \tag{9}$$

where, $J_1$, $J_2$, $J_3$, $J_4$ are the proton transport flux at the left boundary of the anode catalytic layer, at the interface between the anode catalytic layer and the proton exchange membrane, at the interface between the proton exchange membrane and the cathode catalytic layer, and at the right boundary of the cathode catalytic layer;

for the proton transport flux at the interface between the anode catalytic layer and the proton exchange membrane and at the interface between the proton exchange membrane and the cathode catalytic layer, the expressions are as follows:

$$\begin{cases} J_1, \ J_4 = 0 \\ J_2, \ J_3 = I \end{cases} \tag{10}$$

where I is current density;

for the water conservation portion caused by the proton transport flux gradient, calculation expressions are as follows:

$$\begin{cases} \dfrac{1}{F}\left(n_d \dfrac{\partial J_{ion}}{\partial x}\right) \ |_{CLa} = \dfrac{2.5}{22F}\left(\lambda_{CLa} \dfrac{J_2 - J_1}{\delta_{CLa}}\right) \\ \dfrac{1}{F}\left(n_d \dfrac{\partial J_{ion}}{\partial x}\right) \ |_{MEM} = \dfrac{2.5}{22F}\left(\lambda_{MEM} \dfrac{J_3 - J_2}{\delta_{MEM}}\right) \\ \dfrac{1}{F}\left(n_d \dfrac{\partial J_{ion}}{\partial x}\right) \ |_{CLc} = \dfrac{2.5}{22F}\left(\lambda_{CLc} \dfrac{J_4 - J_3}{\delta_{CLc}}\right) \end{cases} \tag{11}$$

where $\dfrac{1}{F}\left(n_d \dfrac{\partial J_{ion}}{\partial x}\right)|_{CLa}$, $\dfrac{1}{F}\left(n_d \dfrac{\partial J_{ion}}{\partial x}\right)|_{MEM}$ and $\dfrac{1}{F}\left(n_d \dfrac{\partial J_{ion}}{\partial x}\right)|_{CLc}$ are the water conservation portions caused by the proton transport flux gradient in the anode catalytic layer, the proton exchange membrane, and the cathode catalytic layer, respectively; $\lambda_{CLa}$, $\lambda_{MEM}$, $\lambda_{CLc}$ are the membrane water content at the center of the anode catalytic layer, the proton exchange membrane, and the cathode catalytic layer, respectively.

2. The discretization modeling method for electro-osmotic drag effect of water conservation in a fuel cell of claim 1, wherein, the conservation equation of membrane water in the fuel cell in S1 is as follows:

$$\dfrac{\rho_{mem}}{EW}\dfrac{\partial(\omega\lambda)}{\partial t} + \nabla \cdot \left(n_d \dfrac{J_{ion}}{F}\right) = \dfrac{\rho_{mem}}{EW}\nabla \cdot \left(\omega^{1.5} D_{mw}\nabla\lambda\right) + S_{mw} \tag{1}$$

where $\rho_{MEM}$ is proton exchange membrane density, EW is equivalent weight of proton exchange membrane, $\omega$ is a volume fraction of ionomer, $\lambda$ is membrane water content, t is time, $n_d$ is an electro-osmotic drag coefficient, $J_{ion}$ is a proton transport flux, F is the Faraday's constant, $D_{mw}$ is a membrane water diffusivity, $S_{mw}$ is a membrane water source term;

the calculation expressions of the membrane water source term are as follows:

$$S_{mw} = \begin{cases} S_{react} - S_{m-v} - S_{m-1} & \text{(cathode catalytic layer)} \\ -S_{m-v} - S_{m-1} & \text{(anode catalytic layer)} \end{cases} \tag{2}$$

where $S_{mw}$ is a membrane water source term, $S_{react}$ is a water source term of electrochemical reaction product, $S_{m-v}$ is a phase change source term between membrane water and water vapor and $S_{m-1}$ is a phase change source term between membrane water and liquid water.

3. The discretization modeling method for electro-osmotic drag effect of water conservation in a fuel cell of claim 2, wherein, the expression of the electro-osmotic drag effect is as follows:

$$\nabla \cdot \left(n_d \dfrac{J_{ion}}{F}\right) = \dfrac{1}{F}\left(J_{ion}\dfrac{\partial n_d}{\partial x} + n_d \dfrac{\partial J_{ion}}{\partial x}\right) \tag{6}$$

where $n_d$ is the electro-osmotic drag coefficient, $J_{ion}$ is the proton transport flux, F is the Faraday's constant, x is a through-plane direction, $\lambda$ is the membrane water content, $$\dfrac{1}{F}\left(J_{ion}\dfrac{\partial n_d}{\partial x}\right)$$

is the water conservation portion caused by a membrane water content gradient, and $$\dfrac{1}{F}\left(n_d \dfrac{\partial J_{ion}}{\partial x}\right)$$

is the water conservation portion caused by a proton transport flux gradient.

4. The discretization modeling method for electro-osmotic drag effect of water conservation in a fuel cell of claim 3, wherein, the calculation expressions of the complete electro-osmotic drag effect are as follows:

$$\begin{cases} \nabla \cdot \left(n_d \dfrac{J_{ion}}{F}\right) \ |_{CLa} = \dfrac{2.5I}{22F}\left(\dfrac{1}{2}\dfrac{\lambda_2 - \lambda_1}{\delta_{CLa}} + \dfrac{\lambda_{CLa}}{\delta_{CLa}}\right) \\ \nabla \cdot \left(n_d \dfrac{J_{ion}}{F}\right) \ |_{MEM} = \dfrac{2.5I}{22F}\left(\dfrac{\lambda_3 - \lambda_2}{\delta_{MEM}}\right) \\ \nabla \cdot \left(n_d \dfrac{J_{ion}}{F}\right) \ |_{CLc} = \dfrac{2.5I}{22F}\left(\dfrac{1}{2}\dfrac{\lambda_4 - \lambda_3}{\delta_{CLc}} - \dfrac{\lambda_{CLc}}{\delta_{CLc}}\right) \end{cases} \tag{12}$$

where I is a current density; F is the Faraday's constant; $\lambda_1$, $\lambda_2$, $\lambda_3$, $\lambda_4$ are the membrane water content at the left boundary of the anode catalytic layer, at the interface between the anode catalytic layer and the proton exchange membrane, at the interface between the proton exchange membrane and the cathode catalytic layer, and at the right boundary of the cathode catalytic layer, respectively; $\delta_{CLa}$, $\delta_{MEM}$, $\delta_{CLc}$ are the thickness of the anode catalytic layer, the proton exchange membrane, and the cathode catalytic layer, respectively; and $\lambda_{CLa}$, $\lambda_{CLc}$ are the membrane water content at the center of the anode catalytic layer and the cathode catalytic layer;

wherein, the membrane water content at the left boundary of the anode catalytic layer, at the interface between the anode catalytic layer and the proton exchange membrane, at the interface between the proton exchange membrane and the cathode catalytic layer, and at the right boundary of the cathode catalytic layer right boundary are solved by linear interpolation, and the calculation expressions are as follows:

$$
\begin{cases}
\lambda_1 = \lambda_{CLa} - \dfrac{\lambda_{MEM} - \lambda_{CLa}}{\delta_{MEM} + \delta_{CLa}}\delta_{CLa} \\[2mm]
\lambda_2 = \lambda_{CLa} + \dfrac{\lambda_{MEM} - \lambda_{CLa}}{\delta_{MEM} + \delta_{CLa}}\delta_{CLa} \\[2mm]
\lambda_3 = \lambda_{MEM} + \dfrac{\lambda_{CLc} - \lambda_{MEM}}{\delta_{CLc} + \delta_{MEM}}\delta_{MEM} \\[2mm]
\lambda_4 = 2\lambda_{CLc} - \lambda_{MEM} - \dfrac{\lambda_{CLc} - \lambda_{MEM}}{\delta_{CLc} + \delta_{MEM}}\delta_{MEM}
\end{cases} \tag{13}
$$

the discretization simulation model of the complete electro-osmotic drag effect obtained based on the conservation equation of membrane water in the fuel cell is as follows:

$$
\begin{cases}
\nabla\cdot\left(n_d\dfrac{J_{ion}}{F}\right)\Big|_{CLa} = \dfrac{2.5I}{22F}\left(\dfrac{\lambda_{MEM} - \lambda_{CLa}}{\delta_{MEM} + \delta_{CLa}} + \dfrac{\lambda_{CLa}}{\delta_{CLa}}\right) \\[3mm]
\nabla\cdot\left(n_d\dfrac{J_{ion}}{F}\right)\Big|_{MEM} = \dfrac{2.5I}{22F}\left(\dfrac{\lambda_{MEM}\delta_{CLc} + \lambda_{CLc}\delta_{MEM}}{\delta_{MEM}(\delta_{MEM} + \delta_{CLc})} - \dfrac{\lambda_{CLa}\delta_{MEM} + \lambda_{MEM}\delta_{CLa}}{\delta_{MEM}(\delta_{MEM} + \delta_{CLa})}\right) \\[3mm]
\nabla\cdot\left(n_d\dfrac{J_{ion}}{F}\right)\Big|_{CLc} = -\dfrac{2.5I}{22F}\left(\dfrac{\lambda_{MEM}}{\delta_{CLc}} + \dfrac{\lambda_{CLc} - \lambda_{MEM}}{\delta_{MEM} + \delta_{CLc}}\dfrac{\delta_{MEM}}{\delta_{CLc}}\right)
\end{cases}. \tag{14}
$$

5. The discretization modeling method for electro-osmotic drag effect of water conservation in a fuel cell of claim 4, wherein, solving the conservation equation of membrane water to establish the discretization simulation model of electro-osmotic drag effect of water conservation in the fuel cell in S4 is as follows:

$$
\lambda_{CLa}^t = \lambda_{CLa}^{t-\Delta t} + \left(\dfrac{(\lambda_{MEM}^{t-\Delta t} - \lambda_{CLa}^{t-\Delta t})D_{MEM\_CLa}^{\lambda\_eff}}{\left(\dfrac{\delta_{CLa}}{2} + \dfrac{\delta_{MEM}}{2}\right)\delta_{CLa}} + \right. \tag{15}
$$

$$
\left. \left(-\dfrac{2.5I}{22F}\left(\dfrac{\lambda_{MEM}^{t-\Delta t} - \lambda_{CLa}^{t-\Delta t}}{\delta_{MEM} + \delta_{CLa}} + \dfrac{\lambda_{CLa}^{t-\Delta t}}{\delta_{CLa}}\right) + S_{mw}\right)\dfrac{EW}{\rho_{MEM}}\right)\dfrac{\Delta t}{\omega_{CLa}};
$$

$$
\lambda_{MEM}^t =
$$
$$
\lambda_{MEM}^{t-\Delta t} + \left(\dfrac{(\lambda_{CLc}^{t-\Delta t} - \lambda_{MEM}^{t-\Delta t})D_{MEM\_CLc}^{\lambda\_eff}}{\left(\dfrac{\delta_{CLc}}{2} + \dfrac{\delta_{MEM}}{2}\right)\delta_{MEM}} - \dfrac{(\lambda_{MEM}^{t-\Delta t} - \lambda_{CLa}^{t-\Delta t})D_{MEM\_CLa}^{\lambda\_eff}}{\left(\dfrac{\delta_{CLa}}{2} + \dfrac{\delta_{MEM}}{2}\right)\delta_{MEM}} - \right. \tag{16}
$$

-continued $$
\left. \dfrac{2.5I}{22F}\left(\dfrac{\lambda_{MEM}^{t-\Delta t}\delta_{CLc} + \lambda_{CLc}^{t-\Delta t}\delta_{MEM}}{\delta_{MEM}(\delta_{MEM} + \delta_{CLc})} - \dfrac{\lambda_{CLa}^{t-\Delta t}\delta_{MEM} + \lambda_{MEM}^{t-\Delta t}\delta_{CLa}}{\delta_{MEM}(\delta_{MEM} + \delta_{CLa})}\right)\dfrac{EW}{\rho_{MEM}}\right)\dfrac{\Delta t}{\omega_{MEM}}
$$

$$
\lambda_{CLc}^t = \lambda_{CLc}^{t-\Delta t} + \left(-\dfrac{(\lambda_{CLc}^{t-\Delta t} - \lambda_{MEM}^{t-\Delta t})D_{MEM\_CLc}^{\lambda\_eff}}{\left(\dfrac{\delta_{CLc}}{2} + \dfrac{\delta_{MEM}}{2}\right)\delta_{CLc}} + \right. \tag{17}
$$

$$
\left. \left(\dfrac{2.5I}{22F}\left(\dfrac{\lambda_{MEM}^{t-\Delta t}}{\delta_{CLc}} + \dfrac{\lambda_{CLc}^{t-\Delta t} - \lambda_{MEM}^{t-\Delta t}}{\delta_{MEM} + \delta_{CLc}}\dfrac{\delta_{MEM}}{\delta_{CLc}}\right) + S_{mw}\right)\dfrac{EW}{\rho_{MEM}}\right)\dfrac{\Delta t}{\omega_{CLc}}
$$

where $$\lambda_{CLa}^t, \lambda_{MEM}^t, \lambda_{CLc}^t$$

are the membrane water content at the center of the anode catalytic layer, the proton exchange membrane and the cathode catalytic layer respectively at the time of t, $$\lambda_{CLa}^{t-\Delta t}, \lambda_{MEM}^{t-\Delta t}, \lambda_{CLc}^{t-\Delta t}$$

correspond to the membrane water content at the center of the anode catalytic layer, the proton exchange membrane and the cathode catalytic layer respectively at the time of t−Δt, $$D_{MEM\_CLa}^{\lambda,eff}, D_{MEM\_CLc}^{\lambda,eff}$$

are the effective conservation of membrane water coefficients between the anode catalytic layer and the proton exchange membrane and between the cathode catalytic layer and the proton exchange membrane respectively, $\delta_{CLa}$, $\delta_{MEM}$, $\delta_{CLc}$ are the thickness of the anode catalytic layer, the proton exchange membrane and the cathode catalytic layer, $\rho_{MEM}$ IS the proton exchange membrane density, EW is the equivalent weight of proton exchange membrane, $\Delta t$ is the time step, $\omega_{CLa}$, $\omega_{MEM}$, $\omega_{CLc}$ are the volume fractions of ionomer of the anode catalytic layer, proton exchange membrane, cathode catalytic layer, I is current density, F is the Faraday's constant, and $S_{mw}$ is the membrane water source term.

* * * * *